United States Patent Office 3,069,414
Patented Dec. 18, 1962

3,069,414
3-HYDRAZONE STEROIDS OF THE ANDROSTANE AND ESTRANE SERIES AND DERIVATIVES THEREOF
Pietro de Ruggieri, Via Chioggia 2, Milan, Italy
No Drawing. Filed Oct. 16, 1961, Ser. No. 145,481
Claims priority, application Italy June 9, 1961
20 Claims. (Cl. 260—239.5)

The present invention relates to compounds of the formula:

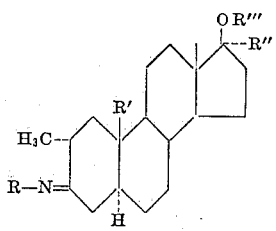

wherein R is a member of the group consisting of —$NH_2$, —$NHCH_3$, —NH—CO—$NH_2$,

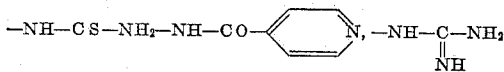

R' is a member of the group consisting of H and $CH_3$; R'' is a member of the group consisting of H and $CH_3$; and R''' is a member of the group consisting of hydrogen and an acyl group derived from an aliphatic carboxylic acid having –12 carbon atoms.

These compounds show very high anabolic properties and a low degree of androgenicity, therefore they are useful in therapy.

As starting materials compounds of general formula:

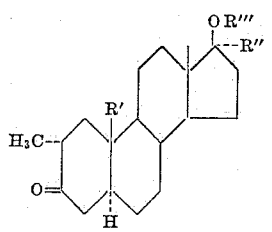

have been selected wherein R' and R'' are members of the group consisting of H and $CH_3$, R''' is a member of the group consisting of hydrogen and an acyl radical derived from an aliphatic acid having 2–12 carbon atoms.

These compounds (H. J. Ringold, E. Batres, O. Halpern, and E. Necoechea, Journ. Amer. Chem. Soc. 81, 427 (1959)) when treated with hydrazine, methyl-hydrazine, semicarbazide, thiosemicarbazide, isonicotinyl hydrazide, or aminoguanidine yield the claimed compounds.

The following examples are given to further illustrate the present invention, the scope of invention not however being limited to the specific details of the examples.

EXAMPLE 1

2α-Methyl-5α-Androstane-17β-Ol-3-Hydrazone 0.2 part of 2α-methyl-5α-androstane-17β-ol-3-one are refluxed for 1 hour with 0.3 part of 85% hydrazine hydrate in 10 parts of ethanol. The reaction mixture is concentrated under nitrogen, diluted with water and filtered. After crystallization from ethanol, 0.1 part of 2α-methyl-5α-androstane-17β-ol-3-hydrazone is obtained, with M.P. 199–203° C.; $[\alpha]_D = +44°$.

EXAMPLE 2

2α-Methyl-5α-Androstane-17β-Ol-3-Methyl-Hydrazone 0.2 part of 2α-methyl-5α-androstane-17β-ol-3-one are refluxed for 2 hours with methyl-hydrazine, obtained from 0.2 part of methyl-hydrazine sulfate and 0.45 part of $Na_2CO_3 \cdot 10H_2O$ in 15 parts of 95% ethanol. The contents are diluted with water, filtered and recrystallized from sulfuric ether. After the contents remain in the refrigerator for a long time, a semicrystalline product, with M.P. 84–94° C., is obtained, which resists crystallization. The infrared spectrum reveals the identity of the substance as 2α-methyl-5α-androstane 17β-ol-3-methyl-hydrazone.

EXAMPLE 3

2α-Methyl-5α-Androstane-17β-Ol-3-Isonicotinyl-Hydrazone 0.2 part of 2α-methyl-5α-androstane-17β-ol-3-one are dissolved in 15 parts of ethanol and refluxed for 2 hours with 0.2 part of isonicotinyl-hydrazine. The reaction mixture is diluted with water, filtered, and then crystallized, obtaining 0.12 part of 2α-methyl-5α-androstane-17β-ol-3-isonicotinyl-hydrazone, with M.P. 204–208° C.; $[\alpha]_D = +1.24$.

EXAMPLE 4

2α-Methyl-5α-Androstane-17β-Ol-3-Semicarbazone 0.2 part of 2α-methyl-5α-androstane-17β-ol-3-one are refluxed for 1 hour in a solution prepared with 0.2 part of semicarbazide hydrochloride and 0.25 part of ethanol. The reaction mixture is concentrated under nitrogen, diluted with water, and filtered. By means of crystallization from methanol, 0.15 part of 2α-methyl-5α-androstane-17β-ol-3-semicarbazone are obtained, with M.P. 169–172° C.; $[\alpha]_D = +40°$.

EXAMPLE 5

2α-Methyl-5α-Androstane-17β-Ol-3-Thiosemicarbazone 0.2 part of 2α-methyl-5α-androstane-17β-ol-3-one are refluxed for 1 hour with 0.25 part of thiosemicarbazide in 20 parts of ethanol. The reaction mixture is concentrated under nitrogen, diluted with water, acidified with hydrochloric acid, filtered and, after crystallization from ethanol, 0.21 part of 2α-methyl-5α-androstane-17β-ol-3-thiosemicarbazone are obtained, with M.P. 218° C. with dec.; $[\alpha]_D = +30°$ (pyridine).

EXAMPLE 6

2α-Methyl-5α-Androstane-17β-Ol-3-Guanyl-Hydrazone 1 part of 2α-methyl-5α-androstane-17β-ol-3-one is refluxed for 1 hour with 20 parts of ethanol, 1.3 parts of amino-guanidine carbonate, and 10.6 parts of 10% methyl-alcoholic potassium hydroxide. The reaction mixture is filtered removing potassium carbonate, concentrated, diluted with water and filtered. By means of crystallization from methanol and ethyl ether, 1.1 parts of 2α-methyl-5α-androstane-17β-ol-3-guanyl-hydrazone are obtained, with M.P. 233–235; $[\alpha]_D = +35°$ (chloroform).

EXAMPLE 7

2α-17α-Dimethyl-5α-Androstane-17β-Ol-3-Hydrazone 1.35 parts of 2α,17α-dimethyl-5α-androstane-17β-ol-3-one are refluxed with 2 parts of 85% hydrazine hydrate in 30 parts of ethanol. The solution is concentrated, diluted with water, filtered and crystallized from sulfuric ether, obtaining 1.2 parts of 2α,17α-dimethyl-5α-androstane - 17β - ol - 3 - hydrazone, with M.P. 252–256° C.; $[\alpha]_D = +80°$ (chloroform).

EXAMPLE 8

2α,17α-Dimethyl-5α-Androstane-17β-Ol-3-Methyl-Hydrazone 2 parts of 2α,17α-dimethyl-5α-androstane-17β-ol-3-one in 5 parts of ethanol are treated with methylhydrazine obtained from 2 parts of methylhydrazine sulphate and 2.5 parts of sodium acetate in 10 parts of ethanol. The contents are refluxed for 1 hour, diluted with water, and crystallized from sulfuric ether, obtaining 2 parts of 2α, 17α-dimethyl-5α-androstane-17β-ol-3-methyl - hydrazone, with M.P. 105–108° C; $[\alpha]_D = +5°$ (chloroform).

EXAMPLE 9

2α,17α-Dimethyl-5α-Androstane-17β-Ol-3-Isonicotinyl-Hydrazone 2 parts of 2α,17α-dimethyl-5α-androstane-17β-ol-3-one are refluxed in 15 parts of ethanol with 2 parts of iso-nicotinyl-hydrazide. The contents are diluted with water and filtered. Crystallization is performed from acetone, obtaining 1.8 parts of 2α,17α-dimethyl-5α-androstane-17β-ol - 3 - isonicotinyl - hydrazone, with M.P. 194-205° C.; $[\alpha]_D = -5°$ (chloroform).

EXAMPLE 10

2α,17α-Dimethyl-5α-Androstane-17β-Ol-3-Semicarbazone 2 parts of 2α,17α-dimethyl-5α-androstane-17β-ol-3-one are refluxed with the filtrate obtained from 2 parts of semicarbazide hydrochloride and 2.5 parts of hydrated sodium acetate in 5 parts of ethanol. The reaction mixture is concentrated under nitrogen, diluted with water, filtered, and crystallized from methanol, obtaining 1.8 parts of 2α,17α-dimethyl-5α-androstane-17β-ol-3-semicarbazone, with M.P. 216–217° C.; $[\alpha]_D = +17°$.

EXAMPLE 11

2α,17α-Dimethyl-5α-Androstane-17β-Ol-3-Thiosemicarbazone 2 parts of 2α,17α-dimethyl-5α-androstane-17β-ol-3-one are refluxed for 1 hour with 2.5 parts of thiosemicarbazide in 20 parts of ethanol. The contents are concentrated under nitrogen and crystallization is performed, obtaining 1.7 parts of 2α,17α-dimethyl-5α-androstane-17β-ol-3-thiosemicarbazone, with M.P. 216–218° C.; $[\alpha]_D = +20°$ (chloroform).

EXAMPLE 12

2α,17α-Dimethyl-5α-Androstane-17β-Ol-3-Guanyl-Hydrazone 5 parts of 2α,17α-dimethyl-5α-androstane-17β-ol-3-one are refluxed for 1 hour with 100 parts of ethanol, 6.4 parts of aminoguanidine carbonate and 53 parts of 10% potassium hydroxide in methanol. The contents are filtered, removing potassium carbonate. The filtrate is concentrated and diluted with water. Crystallization is performed, obtaining 5.7 parts of 2α,17α-dimethyl-5α-androstane-17β-ol-3-guanyl-hydrazone, with M.P. 223–225° C.; $[\alpha]_D = +25°$ (chloroform).

EXAMPLE 13

2α-Methyl-5α-Estrane-17β-Ol-3-Hydrazone 0.15 part of 2α-methyl-5α-estrane-17β-ol-3-one are refluxed for 1 hour with 10 parts of ethanol and 0.2 part of 85% hydrazine hydrate. The ethanol is concentrated and the reaction mixture is diluted with water and filtered. After crystallization from ether, 0.13 part of 2α-methyl-5α-estrane-17β-ol-3-hydrazine are obtained, with M.P. 161–163° C.; $[\alpha]_D = +82°$ (chloroform).

EXAMPLE 14

2α-Methyl-5α-Estrane-17β-Ol-3-Isonicotinylhydrazone 0.5 part of 2α-methyl-5α-estrane-17β-ol-3-one in 10 parts of ethanol are refluxed for 2 hours with 0.5 part of isonicotinylhydrazine. The contents are diluted with water, extracted with chloroform and dried. The residue, after crystallization from sulfuric ether, yields 0.42 part of 2α-methyl-5α-estrane - 17β-ol-3-isonicotinylhydrazone, with M.P. 176–179° C.; $[\alpha]_D = +45°$ (chloroform).

EXAMPLE 15

2α-Methyl-5α-Estrane-17β-Ol-3-Semicarbazone 0.15 part of 2α-methyl-5α-estrane-17β-ol-3-one are refluxed for 1 hour with 10 parts of ethanol and with 0.25 part of semicarbazide acetate in 5 parts of ethanol. The contents are concentrated, diluted with water and filtered. After crystallization from methanol, 0.18 part of 2α-methyl-5α-estrane-17β-ol-3 - semicarbazone are obtained, with M.P. 221–223° C.; $[\alpha]_D = +60°$ (chloroform).

EXAMPLE 16

2α-Methyl-5α-Estrane-17β-Ol-3-Thiosemicarbazone 0.15 part of 2α-methyl-5α-estrane-17β-ol-3-one is refluxed for 1 hour with 0.15 part of thiosemicarbazide in 15 parts of ethanol. The contents are concentrated, diluted with water, acidified with hydrochloric acid and filtered. After crystallization from methanol, 0.15 part of 2α-methyl-5α-estrane-17β-ol-3-thiosemicarbazone is obtained, M.P. 203° C. dec.; $[\alpha]_D = +28°$ (chloroform).

EXAMPLE 17

2α-Methyl-5α-Estrane-17β-Ol-3-Guanyl-Hydrazone 2 parts of aminoguanidine carbonate and 2 parts of 3 N hydrochloric acid are added to 1 part of 2α-methyl-5α-estrane-17β-ol-3-one in 10 parts of ethanol. The contents are left at room temperature for one hour; the hydrochloride and 2α-methyl-5α-estrane-17β-ol-3-guanyl-hydrazone which has been formed is filtered and suspended in 20 parts of 2 N sodium hydroxide.

After 2 hours the free base is filtered and after crystallization from methanolic sulfuric ether, 0.8 part of 2α-methyl-5α-estrane-17β-ol-3-guanylhydrazone is obtained, with M.P. 204–207° C.; $[\alpha]_D = +52°$ (chloroform).

EXAMPLE 18

2α,17α-Dimethyl-5α-Estrane-17β-Ol-3-Hydrazone 0.5 part of hydrazine acetate in 5 parts of ethanol is added to 0.5 part of 2α,17α-dimethyl-5α-estrane-17β-ol-3-one dissolved in 10 parts of ethanol. The reaction mixture is allowed to stand at room temperature for 30 minutes, concentrated under nitrogen, filtered and, after crystallization from methanol-ether, 0.45 part of 2α,17α-dimethyl-5α-estrane-17β-ol-3-hydrazone is obtained, with M.P. 209–212° C.; $[\alpha]_D = +10°$ (dioxane).

EXAMPLE 19

2α,17α-Dimethyl-5α-Estrane-17β-Ol-3-Isonicotinylhydrazone 0.5 part of 2α,17α-dimethyl-5α-estrane-17β-ol-3-one (dissolved in 20 parts of ethanol) and 0.5 part of isonicotinylhydrazide are refluxed for 2 hours. The reaction mixture is diluted with water, filtered and crystallized from sulfuric ether, obtaining 0.48 part of 2α,17α-dimethyl-5α-estrane-17β-ol-3-isonicotinylhydrazone, with M.P. 198–200° C.; $[\alpha]_D = +1.1°$ (chloroform).

EXAMPLE 20

2α,17α-Dimethyl-5α-Estrane-17β-Ol-3-Semicarbazone 0.05 part of 2α,17α-dimethyl-5α-estrane-17β-ol-3-one in 1 part of ethanol and 0.07 part of semicarbazide acetate in 4 parts of ethanol are refluxed for 1 hour. Then the reaction mixture is concentrated and crystallized from ethanol, obtaining 0.04 part of 2α,17α-dimethyl-5α-estrane-17β-ol-3-semicarbazone with M.P. 234–235° C.; $[\alpha]_D = +63.4°$ (pyridine).

EXAMPLE 21

2α,17α-Dimethyl-5α-Estrane-17β-Ol-3-Thiosemicarbazone 0.05 part of 2α,17α-dimethyl-5α-estrane-17β-ol-3-one in 5 parts of ethanol is refluxed for 1 hour with 0.06 part of thiosemicarbazide. The reaction mixture is diluted with water and acidified with 1 N hydrochloric acid. Then the contents are filtered and, after crystallization from methanol-ether, 0.04 part of 2α,17α-dimethyl-5α-estrane-17β-ol-3-thiosemicarbazone is obtained, with M.P. 181–184° C.; $[\alpha]_D = +71.3°$ (chloroform).

EXAMPLE 22

2α,17α-Dimethyl-5α-Estrane-17β-Ol-3-Guanyl-Hydrazone 0.05 part of 2α,17α-dimethyl-5α-estrane-17β-ol-3-one, dissolved in 2 parts of ethanol, is added to 0.2 part of aminoguanidine carbonate and 0.5 part of 3 N hydrochloric acid. The contents are allowed to stand overnight, made alkaline with 2 N sodium hydroxide diluted with water, filtered, extracted with chloroform and dried. By means of crystallization from methanol and sulfuric ether, 0.04 part of 2α,17α-dimethyl-5α-estrane-17β-ol-3-guanylhydrazone is obtained, with M.P. 206–208° C.; $[\alpha]_D = +34°$ (chloroform).

EXAMPLE 23

2α-Methyl-5α-Estrane-17β-Ol-3-Hydrazone-17-Propionate 1 part of 2α-methyl-5α-estrane-17β-ol-3-one-17-propionate in 20 parts of ethanol is treated with 2 parts of hydrazine acetate in 40 parts of ethanol, at room temperature. The contents are then filtered, obtaining 1.05 parts of 2α-methyl-5α-estrane-17β-ol-3-hydrazone-17-propionate with M.P. 241–243° C.; $[\alpha]_D = +95°$ (chloroform).

EXAMPLE 24

2α-Methyl-5α-Androstane-17β-Ol-3-Hydrazone-17-Acetate 0.2 part of 2α-methyl-5α-androstane-17β-ol-3-one-17-acetate in 2 parts of ethanol is treated with 0.3 part of hydrazine acetate in 2 parts of ethanol for 4 hours at room temperature. The contents are then filtered and crystallized from methanol-sulfuric ether, obtaining 0.18 part of 2α-methyl-5α-androstane-17β-ol-3-hydrazone-17-acetate, with M.P. 268–270° C.; $[\alpha]_D = +90°$ (chloroform).

EXAMPLE 25

2α-Methyl-5α-Androstane-17β-Ol-3-Hydrazone-17-Propionate 0.10 part of 2α-methyl-5α-androstane-17β-ol-3-one-17-propionate is refluxed for 1 hour with 10 parts of ethanol and 0.2 part of 85% hydrazine hydrate. The contents are concentrated, diluted with water and filtered. After crystallization from methanol, 0.08 part of 2α-methyl-5α-androstane-17β-ol-3-hydrazone-17-propionate is obtained, with M.P. 252–260° C.; $[\alpha]_D = +115°$ (chloroform).

EXAMPLE 26

2α-Methyl-5α-Androstane-17β-Ol-3-Hydrazone-17-Capronate 0.27 part of hydrazine acetate in 2 parts of methanol is added to 0.15 part of 2α-methyl-5α-androstane-17β-ol-3-one-17-capronate in 0.8 part of methanol.

After 2 hours at room temperature, the reaction mixture is filtered obtaining 0.13 part of 2α-methyl-5α-androstane-17β-ol-3-hydrazone-17-capronate, with M.P. 190–193° C.; $[\alpha]_D = +116°$ (chloroform).

EXAMPLE 27

2α-Methyl-5α-Androstane-17β-Ol-3-Hydrazone-17-Enanthate 0.10 part of 2α-methyl-5α-androstane-17β-ol-3-one-17-enanthate in 2 parts of methanol are allowed to stand at room temperature for 2 hours with 0.2 part of hydrazine acetate in 2 parts of methanol. The reaction mixture is filtered, obtaining 0.08 part of 2α-methyl-5α-androstane-17β-ol-3-hydrazone-17-enanthate, with M.P. 202–204° C.; $[\alpha]_D = +83°$ (chloroform).

EXAMPLE 28

2α-Methyl-5α-Androstane-17β-Ol-3-Hydrazone-17-Decanoate 0.2 part of 2α-methyl-5α-androstane-17β-ol-3-one-17-decanoate dissolved in 2 parts of ethanol, are treated with 0.2 part of hydrazine acetate tin 2 parts of ethanol. The reaction mixture is allowed to stand at room temperature for 24 hours and then filtered. By means of crystallization from sulfuric ether, 0.2 part of 2α-methyl-5-androstane-17β-ol-hydrazone-17-decanoate are obtained, with M.P. 189–190° C.; $[\alpha]_D = +97°$ (chloroform).

EXAMPLE 29

2α-Methyl-5α-Androstane-17β-Ol-3-Guanyl-Hydrazone-17-Acetate 0.10 part of 2α-methyl-5α-androstane-17β-ol-3-one-17-acetate dissolved in 2 parts of ethanol are treated with 0.20 part of amino-guanidine carbonate and 0.5 part of 3 N hydrochloric acid. After 12 hours the reaction mixture is neutralized with methanolic potassium hydroxide, diluted with water and filtered. By means of crystallization from aqueous methanol, 0.09 part of 2α-methyl-5α-androstane-17β-ol-3-guanyl-hydrazone-17-acetate are obtained, with M.P. 268–270° C.; $[\alpha]_D = +50°$ (chloroform).

EXAMPLE 30

2α-Methyl-5α-Androstane-17β-Ol-3-Guanyl-Hydrazone-17-Capronate 0.2 part of 2α-methyl-5α-androstane-17β-ol-3-one-17-capronate in 2 parts of methanol are treated, for 24 hours at room temperature, with 0.2 part of aminoguanidine, carbonate in 4 parts of methanol and 0.6 part of 4 N hydrochloric acid. The reaction mixture is made alkaline with 2 N sodium hydroxide diluted with water and filtered. Crystallization is performed from aqueous methanol and 0.18 part of 2α-methyl-5α-androstane-17β-ol-3-guanyl hydrazone-17-capronate are obtained, with M.P. 118–120° C.; $[\alpha]_D = +43°$ (chloroform).

EXAMPLE 31

2α-Methyl-5α-Androstane-17β-Ol-3-Guanyl-Hydrazone-17-Enanthate

A solution of 0.15 part of amino-guanidine carbonate and 0.8 part of 3 N hydrochloric acid in 5 parts of ethanol is added to 0.10 part of 2α-methyl-5α-androstane-17β-ol-3-one-17 enanthate dissolved in 5 parts of ethanol. The contents are allowed to stand for 1 night at room temperature, then made alkaline, diluted with water, and filtered. Crystallization is performed from aqueous methanol, obtaining 0.08 part of 2α-methyl-5α-androstane-17β-ol-3-guanylhydrazone-17-enanthate, with M.P. 101–103° C.; $[\alpha]_D = +37°$ (chloroform).

EXAMPLE 32

2α-Methyl-5α-Androstane-17β-Ol-3-Guanyl-Hydrazone-17-Decanoate 0.2 part of 2α-methyl-5α-androstane-17β-ol-3-one-17-decanoate in 2 parts of ethanol are treated with 0.2 part of amino guanidine carbonate and 0.5 part of 4 N hydrochloric acid in 3 parts of ethanol. After standing for 12 hours at room temperature, the contents are made alkaline with 2 N sodium hydroxyde, diluted with water, extracted with chloroform and evaporated to dryness. An oily substance is obtained, which by infrared analysis is revealed as 2α-methyl-5α-androstane-17β-ol-3-guanyl-hydrazone-17-decanoate; [α]$_D$=+39° (chloroform).

EXAMPLE 33

2α-Methyl - 5α - Androstane-17β-Ol - 3 - Semicarbazone-17-Propionate 0.10 part of 2α-methyl-5α-androstane-17β-ol-3-one-17-propionate in 2 parts of ethanol are refluxed for 1 hour with 0.15 part of semicarbazide acetate in 2 parts of ethanol. The reaction mixture is concentrated, diluted with water, and filtered. Crystallization is performed from methanol, obtaining 0.07 part of 2α-methyl-5α-androstane-17β-ol-3-semicarbazone - 17 - propionate, with M.P. 222–224° C.; [α]$_D$=+40° (chloroform).

EXAMPLE 34

2α - Methyl - 5α - Androstane - 17β - Ol-3-Thiosemicarbazone-17-Propionate 0.10 part of 2α-methyl-5α-androstane-17β-ol-3-one-17-propionate are refluxed for 1 hour with 0.14 part of thiosemicarbazide in 5 parts of ethanol. The reaction mixture is concentrated, diluted with water, acidified with 3 N hydrochloric acid and filtered, obtaining 0.09 part of 2α-methyl-5α-androstane-17β-ol-3-thiosemicarbazone-17-propionate, with M.P. 228–230° C.; [α]$_D$=+90° (chloroform).

EXAMPLE 35

2α - Methyl - 5α - Estrane-17β-Ol-3-Guanyl-Hydrazone-17-Propionate 0.2 part of 2α-methyl-5α-estrane-17β-ol-3-one-17-propionate in 2 parts of methanol are treated with 0.25 part of amino-guanidine hydrochloride in 2 parts of methanol. The reaction mixture is allowed to stand for 12 hours at room temperature, then made alkaline with 2 N sodium hydroxide, diluted with water and filtered. Crystallization is performed from sulfuric ether, obtaining 0.2 part of 2α-methyl-5α-estrane-17β-ol-3-guanyl-hydrazone-17-propionate, with M.P. 186–189° C.; [α]$_D$=+57° (chloroform).

EXAMPLE 36

2α-Methyl-5α-Estrane-17β-Ol-3-Hydrazone-17-Enanthate 0.2 part of 2α-methyl-5α-estrane-17β-ol-3-one-17-enanthate in 2 parts of methanol are treated for 4 hours at room temperature with 0.25 part of hydrazine acetate in 20 parts of methanol, filtered and crystallization is performed from sulfuric ether, obtaining 0.2 parts of 2α-methyl-5α-estrane-17β-ol-3-hydrazone-17-enanthate, with M.P. 160–163° C.; [α]$_D$=+83° (chloroform).

EXAMPLE 37

2α-Methyl-5α-Estrane-17β-Ol-Guanyl-Hydrazone-17-Enanthate 0.2 part of 2α-methyl-5α-estrane-17β-ol-3-one-17-enanthate, 0.2 part of amino-guanidine carbonate in 8 parts of ethanol and 0.4 part of 3 N hydrochloric acid are maintained at rom temperature for 1 night. After being made alkaline with 2 N sodium hydroxide, diluted with water, filtered and crystallized from petroleum ether, 0.17 part of 2α-methyl-5α-estrane-17β-ol-3-guanylhydrazone-17-enthate are obtained with M.P. 151–154° C.

I claim:

1. A compound of the formula:

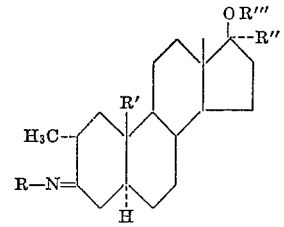

wherein R is a member selected from the group consisting of

—NH$_2$, —NH—CH$_3$, —NH—CO—NH$_2$
—NH—CS—NH$_2$

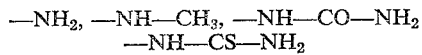

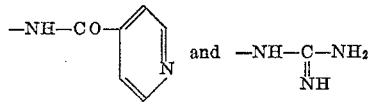

R' is a member selected from the group consisting of H and CH$_3$; R'' is a member selected from the group consisting of H and CH$_3$; and R''' is a member selected from the group consisting of hydrogen and an acyl radical derived from an aliphatic carboxylic acid of from 2–12 carbon atoms.

2. 2α-methyl-5α-androstane-17β-ol-3-hydrazone.
3. 2α - methyl-5α-androstane-17β-ol-3-thiosemicarbazone.
4. 2α - methyl - 5α - androstane-17β-ol-3-guanyl-hydrazone.
5. 2α,17α - dimethyl - 5α - androstane-17β-ol-3-hydrazone.
6. 2α,17α - dimethyl - 5α - androstane, 17β-ol-3-isonicotinyl-hydrazone.
7. 2α,17α - dimethyl-5α-androstane-17β-ol-3-thiosemicarbazone.
8. 2α,17α - dimethyl-5α-androstane-17β-ol-3-guanyl-hydrazone.
9. 2α-methyl-5α-estrane-17β-ol-3-hydrazone.
10. 2α - methyl-5α-estrane-17β-ol-3-guanylhydrazone.
11. 2α,17α-dimethyl-5α-estrane-17β-ol-3-hydrazone.
12. 2α,17α - dimethyl - 5α - estrane-17β-ol-3-guanyl-hydrazone.
13. 2α-methyl - 5α - estrane-17β-ol-3-hydrazone-17-propionate.
14. 2α - methyl-5α-androstane-17β-ol-3-hydrazone-17-acetate.
15. 2α - methyl-5α-androstane-17β-ol-3-hydrazone-17-propionate.
16. 2α - methyl - 5α-androstane-17β-ol-3-hydrazone-17-enanthate.
17. 2α - methyl - 5α-androstrane-17β-ol-3-hydrazone-17-decanoate.
18. 2α - methyl - 5α-androstane-17β-ol-3-guanyl-hydrazone-17-capronate.
19. 2α - methyl - 5α-androstane-17β-ol-3-guanyl-hydrazone-17-enanthate.
20. 2α - methyl - 5α-androstane-17β-ol-3-guanyl-hydrazone-17-decanoate.

No references cited.